United States Patent [19]

Bikson et al.

[11] Patent Number: 5,009,678
[45] Date of Patent: Apr. 23, 1991

[54] PROCESS FOR RECOVERY OF AMMONIA FROM AN AMMONIA-CONTAINING GAS MIXTURE

[75] Inventors: Benjamin Bikson, Brookline; Joyce K. Nelson, Lexington; Jerry E. Perrin, Dorchester, all of Mass.

[73] Assignee: Union Carbide Industrial Gases Technology Corporation, Danbury, Conn.

[21] Appl. No.: 429,817

[22] Filed: Oct. 31, 1989

[51] Int. Cl.$^5$ .................. B01D 53/22; B01D 71/68
[52] U.S. Cl. .................................... 55/16; 55/70
[58] Field of Search ........................... 55/16, 70, 158

[56] References Cited

U.S. PATENT DOCUMENTS

| | | | |
|---|---|---|---|
| 3,369,343 | 2/1968 | Robb | 55/158 X |
| 3,545,931 | 12/1970 | McKinley, Jr. | 55/70 X |
| 3,709,841 | 10/1972 | Quentin | 260/49 |
| 3,723,306 | 3/1973 | Bridgeford | 210/22 |
| 3,735,559 | 5/1973 | Salemme | 55/16 |
| 3,780,496 | 12/1973 | Ward et al. | 55/16 |
| 3,855,122 | 12/1974 | Bourganel | 210/23 |
| 3,875,096 | 4/1975 | Graef et al. | 260/29 |
| 4,029,582 | 6/1977 | Ishii et al. | 55/16 X |
| 4,054,707 | 10/1977 | Quentin | 428/213 |
| 4,156,597 | 5/1979 | Browall | 55/70 X |
| 4,172,885 | 10/1979 | Perry | 55/16 X |
| 4,180,552 | 12/1979 | Graham et al. | 55/16 X |
| 4,180,553 | 12/1979 | Null et al. | 55/16 X |
| 4,181,675 | 1/1980 | Makin et al. | 55/16 X |
| 4,207,182 | 1/1980 | Marze | 210/23 |
| 4,230,463 | 10/1980 | Henis et al. | 55/16 |
| 4,268,650 | 5/1981 | Rose | 525/534 |
| 4,273,903 | 6/1981 | Rose | 525/534 |
| 4,318,714 | 3/1982 | Kimura et al. | 55/16 |
| 4,364,759 | 12/1982 | Brooks et al. | 55/70 X |
| 4,414,368 | 11/1983 | Coplan et al. | 525/534 |
| 4,508,852 | 4/1985 | Bikson et al. | 521/27 |
| 4,515,761 | 5/1985 | Plotzker | 55/16 X |
| 4,521,224 | 6/1985 | Li | 55/16 |
| 4,608,060 | 8/1986 | Kulprathipanja et al. | 55/16 |
| 4,645,516 | 2/1987 | Dashi | 55/70 X |
| 4,684,376 | 8/1987 | Percec et al. | 55/70 X |
| 4,717,395 | 1/1988 | Chiao | 55/16 |
| 4,741,744 | 5/1988 | Wu et al. | 55/16 |
| 4,746,333 | 5/1988 | Peinemann et al. | 55/16 X |
| 4,758,250 | 7/1988 | Laciak et al. | 55/16 |
| 4,762,535 | 8/1988 | Pez et al. | 55/70 X |
| 4,780,114 | 10/1988 | Quinn et al. | 55/70 X |
| 4,793,829 | 12/1988 | Pan et al. | 55/16 |
| 4,880,441 | 11/1989 | Kesting et al. | 55/70 X |
| 4,881,954 | 11/1989 | Bikson et al. | 55/158 X |

FOREIGN PATENT DOCUMENTS

| | | | |
|---|---|---|---|
| 0202841 | 11/1986 | European Pat. Off. | 55/158 |
| 0209935 | 1/1987 | European Pat. Off. | |
| 0237251 | 9/1987 | European Pat. Off. | |
| 0301597 | 2/1989 | European Pat. Off. | 55/16 |
| 59-120205 | 7/1984 | Japan | 55/16 |
| 60-022902 | 2/1985 | Japan | 55/158 |
| 63-051923 | 3/1988 | Japan | 55/158 |
| 63-143924 | 6/1988 | Japan | 55/16 |
| 01-184018 | 7/1989 | Japan | 55/158 |
| 1350342 | 4/1974 | United Kingdom . | |
| 1350343 | 4/1974 | United Kingdom . | |

OTHER PUBLICATIONS

Kamato et al., Gas-Phase Ammonia Sorption on Macroreticular Ion-Exchange Resin, Chem. Abs., 73, 99483b, (1970).

Prokop et al., Sorption of Gaseous Ammonia on Sulfonated Macroreticular Ion Exchanges, J. Poly. Sci., vol. 12, 2535-2543, (1974).

Lochmuller et al., Chemically-Modified Ion-Exchange Membranes as Sampling Devices for Gas-Phase Ammonia, Anal. Letters, 18(A4), 423-428, (1985).

Brubaker et al., Separation of Gases by Plastic Membranes, Ind. Eng. Chem., vol. 46, 733-739, (1954).

Li et al., Membrane Separation Processes in the Petrochemical Industry, Phase I, DOE/ID, 12422-TI (DE 85017030), Dec. 15, 1984, pp. 59, 60.

Primary Examiner—Robert Spitzer
Attorney, Agent, or Firm—Alvin H. Fritschler

[57] ABSTRACT

Composite semi-permeable membranes comprised of an extremely thin layer of a sulfonated polysulfone polymer coated on a porous support are useful in processes for the selective permeation of ammonia from a mixture of gases containing the ammonia component in admixture with other gaseous components.

24 Claims, No Drawings

PROCESS FOR RECOVERY OF AMMONIA FROM AN AMMONIA-CONTAINING GAS MIXTURE

FIELD OF THE INVENTION

This invention relates to an improvement in the ammonia separation process and in particular to the use of composite semi-permeable membranes, e.g., certain sulfonated polysulfone polymers coated on a porous hollow fiber polysulfone support, to separate ammonia from a gas mixture containing said ammonia in admixture with other gaseous components.

DESCRIPTION OF THE PRIOR ART

Permeable membranes capable of selectively permeating one component of a fluid mixture, either liquid or gas, are considered in the art as a convenient, potentially highly advantageous means for achieving gas separations. For practical commercial operations, permeable membranes must be capable of achieving an acceptable level of separation, or selectivity, of the gases contained in the fluids feed stream while, at the same time, achieving a desirably high productivity, or permeability rate, of component separation.

Various types of permeable, or semi-permeable, membranes are known in the art for carrying out a variety of fluid separations. Such membranes have been classified as being of the isotropic, composite, or asymmetric types, their structures being well known to those skilled in this art.

As the advantages of permeable and semi-permeable membranes have become increasingly appreciated, the performance requirements have likewise increased and the drive to find new and improved membranes for more applications has continued to grow. These demands have resulted in the art moving in the direction of very thin membranes having desired permeability characteristics without sacrifice of the separation, or selectivity, characteristics of the membrane.

At the current time permeable membranes are available that are made from a wide variety of materials, e.g. natural and synthetic polymers such as polysiloxanes, polyesters, polyimides, polyamides, polysulfone polymers, brominated polyphenylene oxide, cellulose acetate, ethyl cellulose, polyethylene, polypropylene, polybutadiene, polyisoprene, polystyrene, the polyvinyls, the polycarbonates, and a host of other materials.

A number of industrial processes require separation of ammonia from mixtures with other gases. Most frequently, the ammonia is removed from its mixture with other gases via ammonia liquification in a refrigeration process. For example, the refrigeration process is currently employed in the recovery of ammonia from the recycle loop in an ammonia synthesis plant. A number of sorbtion processes have been proposed for ammonia separation; most notably, cation exchange resins in hydrogen or other ionic forms have been shown to exchange ammonia reversibly (e.g., S. Kamata and M. Tashiro, Kogyo Kagaku Zasshi, 73(6), 1083 (1970), CA, 73, 99484; Z. Prokop et al. in J. Polym. Sci., Polym. Chem. Ed., 12, 2535 (1974); and C. H. Lochmuller et al., Analytical Letters 18A, 423 (1985).

Several membrane based ammonia gas separation processes have been disclosed in the literature. Polyethylene film was used by D. W. Brubaker and K. Krammermeyer, Ind. Enq. Chem., 46, 733 (1954) to separate $NH_3$ from $N_2$ and $H_2$. The low permeation rate of $NH_3$ versus $N_2$ and $H_2$ made the use of polyethylene film economically unattractive. The use of porous carbon membrane to selectively separate $NH_3$ from $N_2$ and $H_2$ is described by R. M. Barrer et al. in J. Chem. Soc. Farady Trans., 1, 69, 2166 (1973). High separation factors were obtained but only at conditions close to ammonia liquification.

In U.S. Pat. No. 4,608,060, S. Kulprathipanja and S. S. Kulkarni disclose the use of multicomponent silicone rubber/polyethylene glycol membrane to separate polar gases from mixtures thereof, including separation of ammonia from $N_2$ and $H_2$.

Recently, in U.S. Pat. No. 4,758,250, D. V. Laciak and G. P. Pez have disclosed a process for separating ammonia from mixtures of other gases or from aqueous streams with an anion exchange polymer cast into membrane form. Alternatively, ammonia recovery may be achieved by employing the said anion exchange polymer as a selective, reversible $NH_3$ sorbent.

In U.S. Pat. No. 4,7793,829, C. Y. Pan and E. M. Hadfield have disclosed the use of polysulfone amide membrane exhibiting selectivity to ammonia permeation for separation of ammonia from gas streams containing ammonia, hydrogen, and contaminant gases. The polysulfone amide membrane was found to separate ammonia from hydrogen particularly well at temperatures below room temperature and as low as about 0° C.

Sulfonated polysulfone materials and their use as gas and liquid separation membranes are well known in the art. For example, in U.S. Pat. No. 3,709,841, Quentin disclosed preparation of sulfonated polyarylether sulfones and their use in liquid based separations, such as desalination and as ion exchange membranes. Improved methods of preparation of polyarylether sulfones and reverse osmosis and ultrafiltration membranes thereof are further disclosed in U.S. Pat. Nos. 3,855,122; 3,875,096; 4,054,707; and 4,207,182, incorporated herein by reference.

Sulfonated polyether sulfones and sulfonated polyetherether sulfones and reverse osmosis and ultrafiltration membranes thereof are disclosed in U.S. Pat. Nos. 4,414,368; 4,508,852; 4,268,650; and 4,273,903, also incorporated herein by reference.

The use of sulfonated polysulfones for specific gas separation processes has been reported as well. For example, sulfonated polysulfone materials have been proposed for separation of carbon dioxide from light hydrocarbons. C. C. Chiao in U.S. Pat. No. 4,717,395 has disclosed the use of sulfonated polyether sulfones for carbon dioxide light hydrocarbon separation, as well as for $O_2/N_2$ separation. In the report to the DOE entitled "Membrane Separation Processes in the Petrochemical Industry, Phase I", from Signal UOP Research Center, Norman N. Li, principal investigator, DOE/ID/ 12422-T1 (DE 85017030), Dec. 15, 1984, pages 59–60, good $CO_2/CH_4$ separation factors were reported for sulfonated polysulfone in both hydrogen and sodium ionic forms.

It has now been found that sulfonated polysulfone membranes can be effectively utilized to separate ammonia gas from ammonia gas-containing streams, such as $NH_3/N_2/H_2$ mixtures. In the preferred embodiment of the invention, it was found that high degrees of ammonia gas separation or selectivity from admixtures of ammonia with other gases, combined with high ammonia permeation rates, can be achieved by utilizing composite membranes prepared by coating sulfonated polysulfones on porous substrate supports.

In European Patent Application No. 237,251, published Sept. 16, 1987, B. N. Hendy inventor, sulfonated arylene polymers are disclosed, including the metal salts thereof. These polymers were used for reverse osmosis and ultrafiltration processes when supported on a porous support at a thickness of one micrometer or less, preferably in the range of 10 to 1000 nm thick, to form a composite membrane. The reference nowhere refers to the use of separation membranes in ammonia separation processes.

U.S. Pat. No. 3,723,306, issued Mar. 27, 1973 to D. J. Bridgeford, relates to separation methods utilizing ion exchange materials or permselective materials that comprise a host material having a guest polymer of an olefinically unsaturated monomer deposited or graft polymerized thereto. The host material used to prepare the ion exchange materials or permselective materials are said to be those which have some appreciable amount of ion exchange capacity (column 4, lines 1–3). This host material is treated with a catalyst and the catalyst-modified host is treated with the desired monomer to effect a graft polymerization within and upon the host, causing formation of the guest polymer in the areas where the catalyst component was positioned. A requirement in this patent is the need to graft polymerize the guest polymer on or within the host material. There is no suggestion or disclosure on the use of a sulfonated polysulfone semi-permeable membrane, for example, a sulfonated semi-permeable membrane in the form of a composite membrane comprising a polysulfone support with the sulfonated polysulfone polymer membrane coated thereon, in a method for separating and recovering ammonia from a mixture thereof with other gases.

The invention disclosed in U.S. Pat. No. 3,780,496, issued Dec. 25, 1973 to W. J. Ward, et al., relates to the separation of helium, hydrogen and oxygen from gas mixtures containing these gases by the use of a sulfonated polyxylylene oxide membrane. There is no mention of the use of a sulfonated polysulfone membrane for the selective separation and recovery of ammonia from a mixture thereof with other gases.

U.S. Pat. No. 438,714, issued Mar. 9, 1982 to S. G. Kimura et al., relates to a method for selectively separating gases using a semi-permeable ion exchange membrane having counter-ions electrostatically contained in the molecule as part of the membrane, the counter-ions reversibly reacting with select gas molecules contained in a gaseous mixture, facilitating transport of the gas through the membrane. The reference specifically disclosed sulfonated polyxylylene oxide based membranes and their use in separations of carbon monoxide from gas mixtures and olefins from gas mixtures. No mention or suggestion is made concerning the use of sulfonated polysulfones to recover ammonia from a mixture thereof with other gases.

In British Patent Specifications Nos. 1,350,342 and 1,350,343, published Apr. 18, 1974, there are described membranes of sulfonated polyaryl ether/sulfones and their use for the fractionation of the different constituents of a solution by osmosis or ultrafiltration processes. The references do not disclose the selective separation of ammonia from a gaseous mixture thereof.

In EPA No. 0 209 935, published Jan. 28, 1987, a wide variety of semi-permeable membranes are disclosed that contain the divalent —SO₃— group in the polymer chain. These polymers are not the same as the sulfonated polysulfones of the invention described in this application. It was also noted there is no disclosure of a process for the separation of ammonia from a mixture thereof.

SUMMARY OF THE INVENTION

This invention pertains to an improvement in the ammonia separation process, the improvement comprising the use of a semi-permeable membrane to separate the ammonia from the other gaseous components in the ammonia-containing feed stream and to processes for the selective permeation of at least one gaseous component stream enriched in ammonia from the ammonia feed stream containing said ammonia from a mixture containing said ammonia in admixture with other gaseous components. The semi-permeable membranes used are the cation exchange-type polymers containing the sulfonic acid ion exchange group in the polymer molecule, such as, sulfonated polysulfones, sulfonated polyether-ether ketones, polymers containing a sulfonated aryl nucleus in the main chain, and polymers having sulfonated aromatic and/or aliphatic groups in the main chain or in a side chain thereof.

For the purpose of this description, the invention is described in more detail using the sulfonated polysulfone membrane materials containing in the polymer molecule the unit:

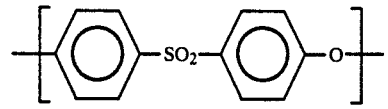

said polymers being more fully described below.

A particularly preferred class of sulfonated polysulfone membranes are the composite semi-permeable sulfonated bisphenol polysulfone membranes comprising a polymer containing unsubstituted or substituted repeating units in which some of the aromatic rings have been sulfonated of the structure:

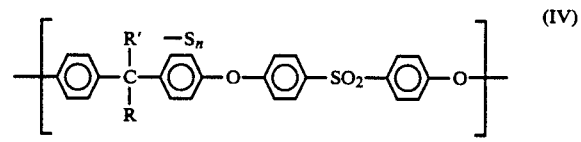

(IV)

which has an average degree of sulfonation of sulfonic acid group per repeat unit of from about 0.2 to about 2. By the term degree of sulfonation is meant that on average from about 0.2 to about 2 sulfonic groups per repeat unit are present; preferably from about 0.4 to about 1.5 sulfonic groups per repeat unit are present.

DETAILED DESCRIPTION OF THE INVENTION

The separation of ammonia from an ammonia-containing stream has been described in U.S. Pat. No. 4,739,829 using a polysulfone amide separation membrane at temperatures below about 0° C. It has now been found that ammonia can be separated at high selectivity and high permeation rate by use of a sulfonated polysulfone membrane material, as hereinafter more fully defined, as the gas separation membrane.

The semi-permeable gas separation membrane of this invention comprises a composite membrane prepared by deposition of a coating of a sulfonated polysulfone cation exchange polymer on a porous support, as, for example, a sulfonated bisphenol polysulfone polymer containing the repeating unit (IV'), the invention also comprises processes for using such semi-permeable composite membranes for recovering a permeate component enriched in ammonia and a second non-permeate component from a gaseous mixture containing ammonia.

In the separation process, the temperature can vary from about −20° C. to about 50° C. It was found that the separation factor of ammonia over hydrogen generally increases with decrease in temperature with no deleterious effect on permeation rate. Thus, operation at lower temperatures might be more economical under certain conditions.

The sulfonated polysulfone cation exchange type polymers containing the sulfonic acid ion exchange group in the polymer molecule used to produce the coating of semi-permeable material on the porous support can be represented by the general formula:

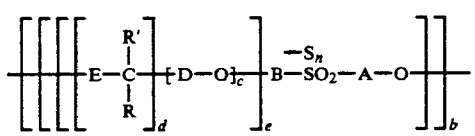

(I)

wherein A, B, D and E are unsubstituted or substituted arylene groups and most preferably p-phenylene, with at least one A, B, D, E group in the polymer chain repeat unit substituted by a free sulfonic acid group or its salified form; b represents the average molecular weight of the polymer molecule and is generally above about 10,000, preferably from about 25,000 to about 80,000; c, d and e are integers having a value of from zero to about 6, preferably from about 1 to about 2; and R' is as hereinafter defined. The extent of sulfonation in the polymer repeat unit is defined as the degree of sulfonation of the molecule and is described by the symbol $-S_n$ wherein S is the sulfonic acid group or its salified form. The groups forming the salified form of the sulfonic group can be the ammonium group, an alkali metal atom, an alkaline earth metal atom, a transition metal atom (in particular zinc II, copper II, cobalt II, nickel II), or an organic salt forming group; these forms being known to the skilled chemist. As previously indicated, the degree of sulfonation can be from about 0.2 to about 2, preferably from about 0.4 to about 1.5. Thus, if one sulfonic acid group is attached to each repeat unit in the polymer chain the degree of sulfonation is 1; if one sulfonic acid group is attached to an average of 5 repeat units in the polymer chain, the degree of sulfonation is 0.2.

Subgeneric to the sulfonated polysulfones represented by formula (I) are (a) the sulfonated polyether sulfones in which the repeating unit in the chain has the general formula:

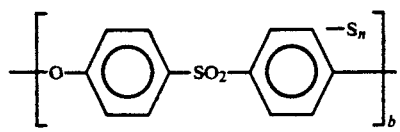

(II)

(b) the sulfonated polyether ether sulfones in which the repeating unit in the chain has the general formula:

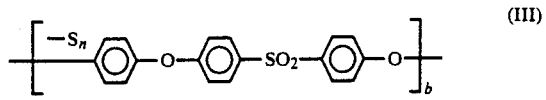

(III)

and (c) the sulfonated polysulfones in which the repeating unit in the chain has the general formula:

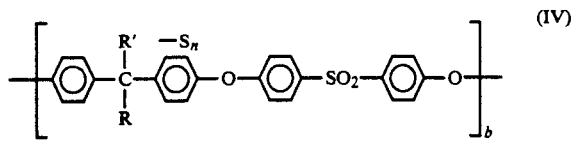

(IV)

wherein R, R', S and n are as hereinafter defined.

For the purpose of more fully describing and explaining the invention, a composite membrane comprising porous hollow fiber polysulfone support coated with an extremely thin layer of sulfonated polysulfone of formula (IV) is discussed below. However, the invention is not limited to this specific structure, its scope being to the extent described in this document. Consequently, in light of the above comments and in accordance with this invention, semi-permeable composite membranes coated with an extremely thin layer of cation exchange polymer are produced containing the sulfonated polysulfone moieties as the recurring unit. These repeating units being represented by the general structure:

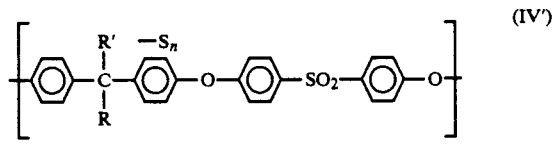

(IV')

wherein R and R' are the same or different and represent an alkyl group having from 1 to about 4 carbon atoms, preferably 1 carbon atom or a halogenated alkyl group, preferably a fluorinated alkyl group; S is a sulfonic acid group (SO$_3$H) or a salt thereof; and n is a positive value and represents the degree of sulfonation in the repeat unit, as previously defined.

Illustrative of bisphenols that can be used in producing the bisphenol polysulfones, one can mention bisphenol-A, 4,4'-[2,2,2-trifluoro-1-(trifluoromethyl)ethylidene]bisphenol, 4,4'-[2,2,2-trifluoro-1-(methyl)ethylidene]bisphenol, and the like.

Sulfonated polysulfone polymers of this invention can be prepared by sulfonation methods known in the art; see, for example, U.S. Pat. No. 3,709,842, wherein Quentin describes a preparation of polymers in which part of the aromatic rings are substituted with hydroxysulfonyl radicals (—SO$_3$H, also called sulfonic groups). Additional methods can be found in E. E. Gilbert, "Sulfonation and Related Reactions", R. E. Krieger Publishing Co., NY (1977) and A. Noshay and L. M. Robeson, J. of Applied Polymer Science, V20, p. 1885 (1976). In general, the sulfonation may be carried out by simple admixture of a solution or suspension of the polysulfone with a sulfonation agent in an inert solvent system. Sulfur trioxide, chlorosulfonic acid and oleum are representative sulfonation agents. An advantageous temperature is within the range of from −25° C. to +80° C., preferably from 0° C. to +50° C. The sulfonated product polymer is usually separated from the reaction mixture by conventional techniques such as filtration, washing and drying.

The sulfonated polysulfone products of this invention are shown to have sulfonate groups on the phenyl moiety distal to the sulfone linking group. Although substitution at these locations theoretically occurs first, it will be appreciated by those skilled in the art that the sulfonate groups may substitute at other positions and in other phenyl moieties of the polymer during sulfonation.

The sulfonated polysulfone polymers of formula (I) are known, as previously referred to. What has now been discovered is that when the sulfonated polysulfones are coated in extremely thin layers on porous polysulfone substrate materials, in particular hollow fibers, composite membranes are produced having unexpected good selectivity and high permeation rate for the recovery of ammonia from a mixture thereof with other gases. The porous polysulfone substrate material can be isotropic or asymmetric. In one embodiment of this invention, it is an asymmetric polysulfone hollow fiber, in another embodiment, the polysulfone hollow fiber is substantially isotropic, with the hollow fiber surface porosity generally being preferably above $10^2$. Surface porosity is defined as an area of surface occupied by pores divided by the total surface area. The size of the surface pores is generally below one micron and most preferably below 0.5 micron. The sulfonated polysulfone is coated on the polysulfone hollow fiber from a solution by procedures known to those skilled in the art to produce a composite membrane.

The production of porous polysulfone hollow fibers is well known. For example, they can readily be produced by the procedure described by I. Cabasso, "Hollow Fiber Membranes", Kirk-Othmer:Enc. of Chem. Tech., 12, Third Ed., 492–518 (1980) and I. Cabasso, "Membranes", Enc. of Pol. Sci. and Eng., 9, Second Ed., 509–579 (1987), incorporated herein by reference.

The composite membranes of this invention are advantageously produced by coating sulfonated polysulfones on porous substrates commonly utilized in the art of composite membrane manufacturing, e.g., polysulfones; polyphenylene oxide; polyolefins, such as polypropylene or polyethylene, polyvinylidene chloride, polyvinylidene fluoride, and the like. The coatings are typically deposited from such common solvents as alcohols, ketones, typical aprotic solvents and mixtures of these solvents with water. Polymers with high degrees of the sulfonic group content are usually more soluble in such common solvents as alcohols and at very high degrees of the sulfonic group content may be soluble in water. The ion-exchange polymers of this invention are preferably coated in their respective sulfonic acid forms which are more soluble in common solvent, but the salified forms can be coated directly as well.

The sulfonated polysulfones of this invention can be used as a pure membrane-forming material, as admixture of several sulfonated polysulfones, or in a mixture with other organic or inorganic materials. When not the sole membrane forming material, the sulfonated polysulfones will typically represent more than 50 percent by weight of the composition of the membrane material and preferably more than 70 percent by weight of the composition of the membrane material. Some typical examples of inorganic materials that can be used in a mixture with sulfonated polysulfones are inorganic acids, such as sulphuric or phosphoric acid. Organic materials useful as admixtures with sulfonated polysulfones can be high molecular weight polymers that can be neutral or can contain ionic groups, e.g., polyvinyl pyridine, polyethylene imine, polyethylene qlycol, polypropylene glycol, etc., or low molecular weight materials and plasticizers, for example, organic salts, polyhydric alcohols such as glycerine, low molecular weight amines such as ethylenediamine, diethylene triamine, acridine, piperazine, pyridine, etc.

If rigorous controls and care are not executed during the composite membrane manufacturing process, residual pores, pinholes, and other defects may occur that could impair final membrane performance. It is well known in the art that membrane post-treating techniques can be effectively utilized to seal these residual defects. The methods particularly useful for post-treating composite membranes are described in U.S. Pat. No. 4,767,422. It was found that if defects do occur in composite membranes of this invention, they can be effectively sealed by post-treating the membranes with low concentrations of highly sulfonated polysulfone or other polyelectrolytes dissolved in water, e.g., polyethylene imine, sulfonated polystyrene, etc. The composite membranes that are adversely effected by the contact with water can be post-treated from common hydrocarbons, such as pentane, hexane, etc., that may contain low concentrations of dissolved polymers, such as polysiloxane, polyvinyltoluene, etc.

Advantageously, the walls of the porous polysulfone hollow fibers are sufficiently thick so that no special apparatus would be required for their handling and they can be conveniently formed into cartridges. The outside diameter of the porous polysulfone hollow fiber can vary from about 1 mil or less to about 100 mils or more, preferably from about 2 mils to about 80 mils. The wall thickness of the porous polysulfone hollow fiber can vary from about 0.1 mil to about 25 mils or more, preferably at least about 0.2 mil up to about 20 mils. The spun polysulfone fibers are generally considered to be substantially isotropic, however, some degree of asymmetry is usually present. Porosity of hollow fibers can be modified, by annealing techniques, particularly by heat annealing. This is conventionally performed by passing the dried porous polysulfone hollow fiber through a hot air oven at a temperature of from about 16° C. up to close to the glass transition temperature of the polysulfone (195°–200° C.) for a period of less than about 30 seconds, preferably not more than about 10 seconds.

In order to provide a desirable flux, the walls of the porous polysulfone hollow fibers are made to contain substantial void volume, particularly those hollow fibers having walls about 2 mils or more in thickness. Voids are regions within the polysulfone hollow fibers which are vacant or devoid of the polysulfone. Thus, when voids are present, the density of the polysulfone hollow fiber is less than the density of the polysulfone polymer per se. The void volume of the polysulfone hollow fiber can be as high as about 90 percent, or from about 10 percent to about 80 percent, and sometimes about 20 percent to about 70 percent, based on the superficial volume, i.e., the volume contained within the gross dimensions of the polysulfone hollow fiber, excluding the bore volume.

The porous polysulfone hollow fiber is coated with, in this instance, the sulfonated polysulfone semi-permeable coating material to form a composite membrane. This coating procedure can be carried out by any of the known methods, e.g., as shown in U.S. Pat. No.

4,467,001, incorporated herein by reference. Using the procedure shown in this patent a solution of the sulfonated polysulfone membrane-forming material is applied to the surface of the porous polysulfone hollow fiber to deposit a finished dry coating up to about 10,000 Angstroms, preferably from about 200 to about 7,000 Angstroms, most preferably from about 500 to about 3,000 Angstroms, adhered to the surface of the porous polysulfone hollow fiber. In some instances, adhesion of the membrane-forming material to the surface of the porous polysulfone hollow fiber can be promoted by coupling agents and/or chemical treatment.

The porous polysulfone hollow fibers used in the examples were spun from a ternary solution of polysulfone in a solvent/non-solvent mixture known in the art using the procedures described by 1. Cabasso et al. in "Composite Hollow Fiber Membranes", Journal of Applied Polymer Science, 23, 1509-1523 and in "Research and Development of NS-1 and related polysulfone hollow fibers for reverse osmosis desalination of seawater" PB 248,666, prepared for the Office of Water Research and Technology, Contract No. 14-30-3165, U.S. Department of the Interior, July 1975. The well known tube-in-tube jet technique was used for the spinning procedure, with water at about room temperature being the outside quench medium for the fibers. The quench medium in the center bore of the fiber was air. Quenching was followed by extensive washing to remove pore forming material. Following the wash, the hollow fibers were dried at elevated temperature by passage through a hot air drying oven.

The composite membranes of this invention comprising a porous polysulfone hollow fiber having a very thin coating layer, e.g., a sulfonated polysulfone, exhibit good selectivity and permeation rate for the recovery of ammonia from a mixture thereof with other gases, as shown below. The composite membranes of this invention show a significantly higher selectivity for the separation of ammonia from a mixture of ammonia with hydrogen and nitrogen when compared to the selectivity achieved with conventional membrane materials such as polysulfone, cellulose acetate, etc. The process disclosed and claimed in this invention can be used to separate ammonia from the other gases present in the ammonia synthesis gas product stream obtained in the commercial operation of the catalytic reaction of hydrogen and nitrogen.

The porous polysulfone hollow fibers used in the examples were about 20 mils outside diameter and about 12-13 mils inside diameter and were produced from a polybisphenol-A ether sulfone (available commercially as polysulfone P 3500 sold by Amoco Performance Products) comprising a plurality of repeating units of the formula:

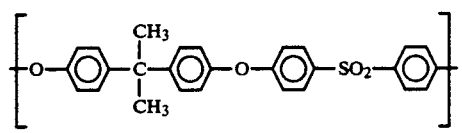

following the procedure described by I. Cabasso, supra. In this method, the porous polysulfone hollow fibers are basically isotropic (Fibers A) and possess high levels of surface porosity most suitable for preparation of composite membranes. However, fibers prepared by dry-wet techniques do possess some gradation of porosity from interior to exterior of the fiber considered in the field to impart some asymmetric characteristics to the hollow fibers. These porous polysulfone hollow fibers (Fibers A) when dried and annealed at elevated temperature can undergo some densification that will frequently impart some improved characteristics to the hollow fibers, for example, high level of pressure compaction resistance (Fibers B).

In the annealing step, the spun porous polysulfone hollow fibers (Fibers A) were dried at about 120° C. by passing through a hot-air oven followed by passing through a hot-air oven at a temperature of about 175° C. The residence time in the two ovens during heat treatment was ten seconds.

The following examples serve to further illustrate the invention.

EXAMPLE 1

Part A.

Preparation of Sulfonated F6-BisA-Polysulfone

Fifty g of F6-BisA-polysulfone (poly[oxy-1,4-phenylenesulfonyl-1,4-phenyleneoxy-1,4-phenylene[2,2,2-trifluoro-1-(trifluoromethyl)ethylidene]-1,4-phenylene]) were dissolved in 500 ml. of methylene chloride in a reaction flask equipped with a mechanical stirrer, thermometer, condenser, and nitrogen inlet and outlet. The reaction flask was cooled to $-4°$ C. and 26.45 g of chlorosulfonic acid dissolved in 135 ml of methylene chloride were added over a period of five minutes under nitrogen atmosphere. The reaction flask was brought to room temperature, circa 25° C., and the reaction mixture stirred for five hours. The reaction was terminated, the methylene chloride decanted, and the precipitate washed with methylene chloride and dissolved in 500 ml of 80/20 ethanol-water mixture (by volume). The solution of the sulfonated product was then dialyzed using conventional cellulose dialysis bags, the dialyzate was rotovaped to dryness and dried in a vacuum oven at 70° C. to a constant weight. The thus prepared sulfonated F6-BisA-polysulfone (6F-SPS) had an ion exchange capacity of 1.35 meg/g of dry polymer in $H^+$ form. Part B Composite gas separation membranes were prepared by coating porous polysulfone hollow fibers (Fibers A type) with a solution of 6F-SPS in ethanol. The coating solution was prepared by dissolving 1.25 g 6F-SPS in 100 cc of reagent alcohol and then filtered through a 1.5 micron glass filter. The polysulfone composite membrane was prepared by passing the dry polysulfone hollow fibers through the coating solution bath essentially as described in U.S. Pat. No. 4,467,001. The solvent was evaporated by passing the fibers through a dryer oven at circa 65° C. with a residence time of 15 seconds.

Part C

The gas permeation characteristics of the composite membrane prepared in Part B were measured by conventional methods with pure gas and mixed gas streams. In all cases, the miniature permeators were prepared with 8 to 16 fibers, 16-inches long, shaped in a U-loop configuration and potted in a tube sheet. The permeators were placed into stainless-steel housings, and the high pressure feed was directed to flow through the shell side of the permeator at controlled pressure and temperature. The permeate was withdrawn from the fiber openings in the tubesheet at atmospheric pressure and its flow and gas composition measured on a periodic basis. The gas permeation rates throughout all examples are reported in ft³(STP)/ft².psi.day, the separation factor is defined as ratio of respective permeation rates of two gases, and all permeation measurements were performed at 25° C. unless specified otherwise.

Four miniature permeators were tested for permeability of pure ammonia gas at 10 psig and in addition their hydrogen permeation rates were determined utilizing a 30/70 $H_2/CH_4$ mixture (by volume) at 100 psig. The average ammonia permeation rate was found to be 46 ft³(STP)/ft².psi.day, the average hydrogen permeation rate 0.28 ft³(STP)/ft².psi.day, and the average $\alpha$ ($NH_3/H_2$) separation factor 164.

EXAMPLE 2

Three miniature permeators equipped with composite 6F-SPS membranes were constructed as described in Example 1 and tested for ammonia separation characteristics utilizing feed gas comprised of a ternary mixture of $NH_3/N_2/H_2$ 10/30/60 by volume at 100 psig at close to zero stage cut conditions. The averages of measured gas permeation rates and separation factors for these four permeators at two different temperatures are summarized in the Table.

| Temperature | Ammonia Permeation Rate* | Hydrogen Permeation Rate* | $\alpha NH_3/H_2$ |
|---|---|---|---|
| 22° C. | 7.5 | 0.22 | 33 |
| 9° C. | 8.9 | 0.14 | 63 |

*in ft³ (STP)/ft² · psi · day

In these experiments, separation factors between $NH_3$ and $N_2$, $\alpha$ ($NH_3/N_2$) was above 1000. Precise determination of $\alpha$ ($NH_3/N_2$) separation factor was difficult for this particular gas mixture due to extremely low levels of nitrogen in the permeate gas. The example demonstrates good membrane separation characteristics for mixed ammonia gas streams and substantial improvements in membrane separation performance with decrease in temperature.

EXAMPLE 3

Part A

One hundred grams of polysulfone (UDEL P 3500) were dried under vacuum at 80° C. for three hours and then added to methylene chloride making a 20% by volume solution. After cooling to 5° C., a solution (20% by volume) of 34.23 g of chlorosulfonic acid in methylene chloride was added drop-wise with stirring over a 90 minutes period. The mole ratio of chlorosulfonic acid to polysulfone was 1.3:1. Precipitation occurred before the end of the addition of the chlorosulfonic acid solution, yielding a reddish brown colored material. The reaction was stirred an additional two hours and then the methylene chloride was removed by decantation, the precipitate was washed with methylene chloride and dissolved in a 90/10 solution of isopropanol/water to give a hazy mixture. This was roto-evaporated to dryness and the dried sulfonated polysulfone had an ion exchange capacity (IEC) of 1.23 meq/g of dry polymer in the H+ form.

Part B

A composite membrane was produced by coating the porous polysulfone hollow fibers (Fiber B) with the sulfonated polysulfone produced in Part A of this example. The coating solution was a one weight percent solution of the sulfonated polysulfone in methoxyethanol. The solution was filtered through a 1.5 micron glass filter and then used to coat the porous hollow fibers by a free coating method essentially as described in U.S. Pat. No. 4,467,001.

The acid form of the sulfonated polysulfone composite was readily exchanged into respective cationic forms by immersing the composite membrane in one molar solutions of the appropriate cation exchange material in water (usually a salt solution) at ambient temperature for 24 hours to convert to the corresponding cation exchange form. The salts used were NaCl and $CuSO_4$. The thus treated cationic forms of the composite membranes were dried and evaluated at 50 psi at close to zero stage cut conditions using a gaseous feed mixture of 9.2% ammonia, 30.8% nitrogen and 60.0% hydrogen (by volume). The results are tabulated below for composite membranes in which the cation is $NH_4^+$, $Na^+$ and $Cu^{++}$.

| Cationic Form | $NH_4^+$ | $Na^+$ | $Cu^{++}$ |
|---|---|---|---|
| Selectivity $NH_3/H_2$ | 10.4 | 6.8 | 10.6 |
| Permeation Rate of $NH_3$(a) | 3.47 | 3.18 | 3.50 |

(a)P/t = ft³ (STP)/ft² · day · psi

EXAMPLE 4

Part A 100 grams of polysulfone (UDEL P-3500) was sulfonated in a manner similar to that described in Example 3. The sulfonated polysulfone had an IEC of 1.3 meq/g.

Part B

A composite membrane was prepared in a manner similar to that described in Example 3 using a filtered coating solution prepared by dissolving two grams of the sulfonated polysulfone in 100 ml of-methoxyethanol. The composite membrane of the polysulfone hollow fibers coated with the sulfonated polysulfone was tested for gas separation characteristics using a gaseous feed mixture of the same composition shown in Example 3. The selectivity of ammonia over nitrogen was 1400, the selectivity of ammonia over hydrogen was 19 and the permeation rate of ammonia was 3.1 ft³(STP)/ft².day.psi.

What is claimed is:

1. A process for separating ammonia from a gaseous mixture thereof with other gaseous components which comprises contacting said gaseous mixture with one side of a gas separation composite membrane comprising a porous support coated with a thin layer of a cation exchange type polymer containing the sulfonic acid ion exchange group in the polymer molecule represented by the general formula:

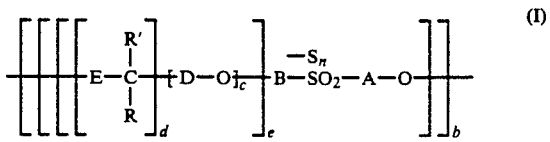

wherein A, B, D and E are unsubstituted or substituted arylene groups with at least one A, B, D, E groups in the polymer chain repeat unit substituted by a free sulfonic acid group or its salified form: R and R' can be the same or different and represent an alkyl group or a halogenated alkyl group having from 1 to 4 carbon atoms; b represents the polymer average molecular weight, generally above about 10,000; c, d and e are integers having a value of from zero to about 6; and the degree of sulfonation —$S_n$ is from about 0.2 to about 2; and recovering the permeate and retentate components, said polymer providing enhanced selectivity and permeability characteristics for the selective permeation and separation of ammonia as the permeate component from the other components of the gaseous mixture comprising retentate components.

2. A process as claimed in claim 1 wherein said polymer average molecular weight is from about 25,000 to about 80,000.

3. A process as claimed in claim 2 wherein the degree of sulfonation is from about 0.4 to about 1.5.

4. A process as claimed in claim 1 wherein R' is methyl.

5. A process as claimed in claim 1 wherein R' is trifluoromethyl.

6. A process as claimed in claim 1 wherein A, B, D, E are p-phenylene groups.

7. A process as claimed in claim 1 wherein the degree of sulfonation is from about 0.4 to about 1.5.

8. A process as claimed in claim 1 wherein said cation exchange polymer is a sulfonated polyether sulfone in which the repeating unit in the chain has the general formula:

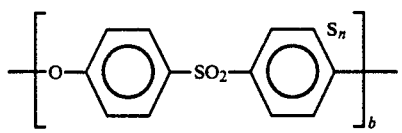
(II)

wherein b and $S_n$ are as defined in claim 1.

9. A process as claimed in claim 1 wherein said cation exchange polymer is a sulfonated polyether ether sulfone in which the repeating unit in the chain has the general formula:

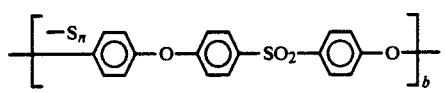
(III)

wherein b and $S_n$ are as defined in claim 1.

10. A process as claimed in claim 1 wherein said cation exchange polymer is a sulfonated polysulfone in which the repeating unit in the chain has the general formula:

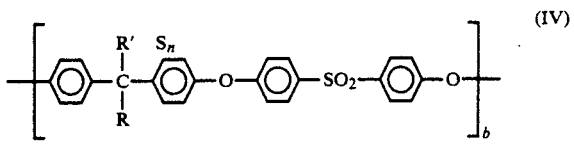
(IV)

wherein b, R, R' and $S_n$ are as defined in claim 1.

11. A process as claimed in claim 10 wherein R' is trifluoromethyl.

12. A process as claimed in claim 10 wherein and R' is methyl.

13. A process as claimed in claim 10 wherein the sulfonic acid group is in the salified form wherein the cation is NH4, Cu or Co.

14. A process as claimed in claim 10 wherein R' is trifluoromethyl.

15. A process as claimed in claim 10 wherein said thin layer is from about 200 to about 7,000 Angstroms thick.

16. A process as claimed in claim 10 wherein said thin layer comprises a thin coating layer less than about 10,000 Angstroms thick, the material of said thin layer comprising at least 50 percent by weight of said sulfonated polysulfone.

17. A process as claimed in claim 1 wherein said thin layer comprises a thin coating less than about 10,000 Angstroms thick.

18. A process as claimed in claim 17 wherein the material of said thin layer comprises at least 50 percent by weight of sulfonated polysulfone of the general formula:

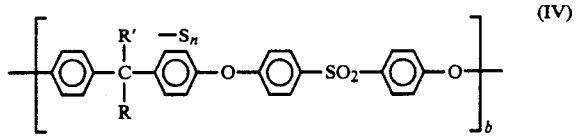
(IV)

wherein b, R, R' and $S_n$ are as defined in claim 1.

19. A process as claimed in claim 18 wherein said sulfonated polysulfone is in the salified form wherein the cation is the ammonium group, an alkali metal atom, an alkaline earth metal atom, a transition metal atom, or an organic salt-forming group.

20. A process as claimed in claim 18 wherein the degree of sulfonation of the polysulfone polymer comprising said thin layer is such that the number of sulfonic groups is from about 0.5 to about 2 milliequivalents per gram of dry polymer in acid form.

21. A process as claimed in claim 17 wherein said sulfonated polysulfone is sulfonated bisphenol-A polysulfone.

22. A process as claimed in claim 17 wherein said sulfonated polysulfone is poly[oxy-1,4-phenylenesulfonyl-1,4-phenyleneoxy-1,4-phenylene[2,2,2-trifluoro-1-(trifluoromethyl)ethylidene]1,4-phenylene].

23. A process as claimed in claim 1 wherein said thin layer is from about 500 to about 3,000 Angstroms thick.

24. The process of claim 1 in which said gaseous mixture comprises ammonia and hydrogen, said ammonia as the permeate component being separated from a retentate component comprising hydrogen.

* * * * *